(12) United States Patent
Citron

(10) Patent No.: US 9,175,104 B2
(45) Date of Patent: *Nov. 3, 2015

(54) ETHYLENE POLYMERIZATION PROCESS AND POLYOLEFIN

(75) Inventor: Joel David Citron, Wilmington, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 291 days.

This patent is subject to a terminal disclaimer.

(21) Appl. No.: 13/576,724

(22) PCT Filed: Mar. 28, 2011

(86) PCT No.: PCT/US2011/030123
§ 371 (c)(1),
(2), (4) Date: Aug. 2, 2012

(87) PCT Pub. No.: WO2011/126784
PCT Pub. Date: Oct. 13, 2011

(65) Prior Publication Data
US 2012/0309915 A1  Dec. 6, 2012

Related U.S. Application Data

(60) Provisional application No. 61/318,570, filed on Mar. 29, 2010, provisional application No. 61/318,556, filed on Mar. 29, 2010, provisional application No. 61/357,368, filed on Jun. 22, 2010, provisional application No. 61/357,362, filed on Jun. 22, 2010, provisional application No. 61/362,563, filed on Jul. 8, 2010, provisional application No. 61/390,365, filed on Oct. 6, 2010.

(51) Int. Cl.
*C08F 10/02* (2006.01)
*C08F 4/70* (2006.01)
*C08F 110/02* (2006.01)

(52) U.S. Cl.
CPC ............... *C08F 4/70* (2013.01); *C08F 4/7042* (2013.01); *C08F 110/02* (2013.01); *C08F 2500/09* (2013.01)

(58) Field of Classification Search
CPC ........... C08F 4/70; C08F 4/7042; C08F 10/02
USPC ................................. 526/352, 172
See application file for complete search history.

(56) References Cited

U.S. PATENT DOCUMENTS

| | | | |
|---|---|---|---|
| 5,071,927 A | 12/1991 | Benham et al. | |
| 5,137,994 A | 8/1992 | Goode et al. | |
| 5,616,529 A | 4/1997 | Ostoja et al. | |
| 5,686,542 A | 11/1997 | Ostoja et al. | |
| 5,753,785 A | 5/1998 | Reddy et al. | |
| 5,856,610 A | 1/1999 | Tamura et al. | |
| 5,880,241 A * | 3/1999 | Brookhart et al. | 526/348 |
| 6,103,946 A | 8/2000 | Brookhart et al. | |
| 6,127,497 A * | 10/2000 | Matsunaga et al. | 526/141 |
| 6,194,341 B1 * | 2/2001 | Canich et al. | 502/113 |
| 6,297,338 B1 * | 10/2001 | Cotts et al. | 526/352 |
| 6,417,305 B2 * | 7/2002 | Bennett | 526/161 |
| 6,586,358 B2 * | 7/2003 | Llatas et al. | 502/167 |
| 6,586,550 B2 * | 7/2003 | Cotts et al. | 526/352 |
| 6,620,895 B1 * | 9/2003 | Cotts et al. | 526/113 |
| 6,620,897 B1 * | 9/2003 | Smillie | 526/171 |
| 7,459,521 B2 * | 12/2008 | Citron | 528/503 |
| 7,696,280 B2 * | 4/2010 | Krishnaswamy et al. | 525/240 |
| 7,745,557 B2 * | 6/2010 | McDaniel et al. | 526/348.2 |

FOREIGN PATENT DOCUMENTS

| | | | | |
|---|---|---|---|---|
| WO | 9015085 A1 | 12/1990 | | |
| WO | WO 03/040199 A1 * | 5/2003 | | C08L 23/06 |

OTHER PUBLICATIONS

N. Maraschin, Ethylene Polymers, LDPE, in J. I. Kroschwitz, et al., Ed., Encyclopedia of Polymer Science and Technology H. Mark, 3rd Ed., vol. 2, Wiley Interscience, (2003) pp. 412-441.

D.M. Simpson & G.A. Vaughan, Ethylene Polymers, LLDPE, in J.I. Kroschwitz, et al., Ed., Encyclopedia of Polymer Science and Technology, H. Mark, 3rd Ed., vol. 2, Wiley Interscience, (2003) pp. 441-482.

E. Benham, Ethylene Polymers, LDPE, in J. I. Kroschwitz, et al., Ed., Encyclopedia of Polymer Science and Technology, H. Mark, 3rd Ed., vol. 2, Wiley Interscience, (2003) pp. 382-412.

C. Denger, et al., Makromol. Chem. Rapid Commun., vol. 12, pp. 697-701 (1991).

E. A. Benham, et al., Polymer Engineering and Science, vol. 28, pp. 1469-1472 (1988).

PCT International Search Report for Corresponding International Application No. PCT/US2011/030123, Jolanda Zurkinden Authorized Officer, Aug. 26, 2011.

Bianchini C et al., Ethylene Oligomerization, Homopolymerization and Copolymerization by Iron and Cobalt Catalysis with 2,6-(bis-organylimino)pyridyl Ligands, Coordination Chemistry Reviews, Elsevier Science vol. 250 No. 11-12, pp. 1391-1418 Jun. 1, 2006.

* cited by examiner

*Primary Examiner* — Rip A Lee

(57) ABSTRACT

A polymerization to form a branched polyolefin, in which polymerization an ethylene copolymerization catalyst and an ethylene oligomerization catalyst form a series of ethylene oligomers that are α-olefins are both present, gives an improved polyethylene if the oligomerization catalyst has a relatively high Schulz-Flory constant.

31 Claims, No Drawings

ETHYLENE POLYMERIZATION PROCESS AND POLYOLEFIN

CROSS-REFERENCE TO RELATED APPLICATIONS

This application claims the benefit of priority of U.S. Provisional Application Nos. 61/318,556 filed on Mar. 29, 2010; 61/318,570 filed on Mar. 29, 2010; 61/357,362 filed on Jun. 22, 2010; 61/357,368 filed on Jun. 22, 2010; 61/362,563 filed on Jul. 8, 2010; and 61/390,365 filed on Oct. 2, 2010 which are herein incorporated by reference in their entirety.

BACKGROUND OF THE INVENTION

Polymerization of olefins, especially ethylene, to form polyolefins is an important commercial process. Millions of tons of such polymers are produced annually. Among the useful grades of polyethylene is Low Density Polyethylene (LDPE), which is usually made by a high pressure process to yield a polyethylene that has excellent processability, see for instance N. Maraschin, *Ethylene Polymers, LDPE*, in J. L Kroschwitz, et al., Ed., *Encyclopedia of Polymer Science and Technology, H. Mark*, 3$^{rd}$ Ed., Vol. 2, Wiley Interscience, (2003) pp. 412-441, which is hereby included by reference. Such LDPE usually has short chain branching and is also believed to have long chain branching (LCB), although the lengths of these long chains is not known. It is believed that the good processability of LDPE is due to the presence of these long chain branches.

There are other grades of polyethylenes that, while not usually having LCBs, are also useful. Although they generally do not process as well as LOPE, they have other superior properties that render them useful. Such grades of polyethylene (PE) include Linear Low Density Polyethylene (LLDPE) and High Density Polyethylene (HDPE). LLDPE can have short chain branches, see for instance D. M. Simpson & G. A. Vaughan, *Ethylene Polymers, LLDPE*, in J. I. Kroschwitz, et al., Ed., *Encyclopedia of Polymer Science and Technology, H. Mark*, 3$^{rd}$ Ed., Vol. 2, Wiley Interscience, (2003) pp. 441-482 (this reference also has a good comparison and description to the properties of LOPE), which is hereby included by reference. HOPE may be linear or have a small amount of short chain branches, see for instance E. Benham, *Ethylene Polymers, LDPE*, in J. L Kroschwitz, at al., Ed., *Encyclopedia of Polymer Science and Technology, H. Mark*, 3$^{rd}$ Ed., Vol. 2, Wiley Interscience, (2003) pp. 382-412, which is hereby included by reference.

It has been a longstanding goal to produce other PEs such as HDPE or LLDPE that process similarly to or better than LDPE, while retaining the other superior physical properties possessed by these PEs.

U.S. Pat. No. 6,297,338, which is hereby included by reference, describes a process in which an ethylene copolymerization catalyst is combined with an ethylene oligomerization catalyst that produces α-olefins to produce branched PE similar to LLDPE. No specific mention is made of using an oligomerization catalyst with a high Schulz-Flory Constant ("SFC"), nor is it stated that the processability of such a polyolefin can be improved by use of an oligomerization catalyst with a high SFC.

U.S. Pat. No. 6,586,550 describes PEs made by the process of U.S. Pat. No. 6,297,338. The PEs described in this patent were not made using oligomerization catalysts with high SFCs.

U.S. Pat. No. 6,103,946 describes the production of α-olefins using iron complexes of certain diimines of 2,6-diacylpyridines or 2,6-pyridinedicarboxaldehydes. Nothing is said of using the resulting α-olefins in situ to produce a copolymer.

Other references that report simultaneous oligomerization and polymerization of various olefins are World Patent Application 90/15085, U.S. Pat. Nos. 5,616,529, 5,753,785, 5,856, 610, 5,686,542, 5,137,994, and 5,071,927, C. Denger, et al., Makromol. Chem., Rapid Commun., vol. 12, pp. 697-701 (1991), and E. A. Benham, et al., Polymer Engineering and Science, vol. 28, pp. 1469-1472 (1988). None of these describe using oligomerization catalysts with high SFCs. These references also describe various catalysts for producing α-olefins, although none are mentioned as giving a series of α-olefins having a relatively high Schulz-Flory constant.

SUMMARY OF THE INVENTION

This invention concerns a process for the manufacture of a branched polyethylene, comprising, contacting ethylene with a copolymerization catalyst and an ethylene oligomerization catalyst that produces a series of α-olefins, wherein the improvement comprises, said oligomerization catalyst producing said series of α-olefins having a SFC of from about 0.75 to about 0.995 under process conditions.

Also described herein are the polyolefins that are the products of the above process. Other features and advantages of the present invention will be better understood by reference to the detailed description and examples that follow.

DETAILED DESCRIPTION OF THE INVENTION

In this description certain terms are used and some of them are defined below.

By "hydrocarbyl group" is meant a univalent group containing only carbon and hydrogen. As examples of hydrocarbyls may be mentioned unsubstituted alkyls, cycloalkyls, and aryls. If not otherwise stated, it is preferred that hydrocarbyl groups (and alkyl groups) herein contain 1 to about 30 carbon atoms.

By "substituted hydrocarbyl" is meant a hydrocarbyl group that contains one or more substituent groups that are inert under the process conditions to which the compound containing these groups is subjected (e.g., an inert functional group, see below). The substituent groups also do not substantially detrimentally interfere with the polymerization process or the operation of the polymerization catalyst system. If not otherwise stated, it is preferred that (substituted) hydrocarbyl groups herein contain from 1 to about 30 carbon atoms. Included in the meaning of "substituted" are rings containing one or more heteroatoms, such as nitrogen, oxygen, and/or sulfur, and the free valence of the substituted hydrocarbyl may be to the heteroatom. In a substituted hydrocarbyl, all of the hydrogens may be substituted, as in trifluoromethyl.

By "(inert) functional group" herein is meant a group, other than hydrocarbyl or substituted hydrocarbyl, that is inert under the process conditions to which the compound containing the group is subjected. The functional groups also do not substantially deleteriously interfere with any process described herein where the compound in which they are present takes part. Examples of functional groups include halo (fluoro, chloro, bromo and iodo), and ether such as —OR$^{50}$ wherein R$^{50}$ is hydrocarbyl or substituted hydrocarbyl. In cases in which the functional group may be near a transition metal atom, the functional group alone should not coordinate to the metal atom more strongly than the groups in those compounds that are shown as coordinating to the metal atom, that is, they should not displace the desired coordinating group.

By a "cocatalyst" or a "catalyst activator" is meant one or more compounds that react with a transition metal compound to form an activated catalyst species. One such catalyst activator is an "alkylaluminum compound," which herein means a compound in which at least one alkyl is group is bound to an aluminum atom. Other groups, such as, for example, alkoxide, hydride, an oxygen atom bridging two aluminum atoms, and halogen may also be bound to aluminum atoms in the compound.

By an "α-olefin" is meant a composition predominantly comprising a compound OF mixture of compounds of the formula $H(CH_2CH_2)qCH=CH_2$ wherein q is an integer of 1 or more. The product may further contain small amounts (preferably less than about 30 weight percent, more preferably less than about 10 weight percent, and especially preferably less than about 2 weight percent) of other types of compounds such as alkanes, branched alkenes, dienes and/or internal olefins.

By a "series" of α-olefins is meant compounds having the formula $H(CH_2CH_2)qCH=CH_2$ wherein at least three compounds, more preferably at least 5 compounds, having different q values are produced. Preferably at least three of these values are 1, 2, and 3.

By "aryl" is meant a monovalent aromatic group in which the free valence is to the carbon atom of an aromatic ring. An aryl may have one or more aromatic rings, which rings may be fused, connected by single bonds, or connected to other groups.

By "substituted aryl" is meant a monovalent substituted aromatic group that contains one or more substituent groups that are inert under the process conditions to which the compound containing these groups is subjected (e.g., an inert functional group, see below). The substituent groups also do not substantially detrimentally interfere with the polymerization process or operation of the polymerization catalyst system. If not otherwise stated, it is preferred that (substituted) aryl groups herein contain 1 to about 30 carbon atoms. Included in the meaning of "substituted" are rings containing one or more heteroatoms, such as nitrogen, oxygen, and/or sulfur, and wherein the free valence of the substituted hydrocarbyl may be to the heteroatom. In a substituted aryl, all of the hydrogens may be substituted, as in trifluoromethyl. These substituents include (inert) functional groups. Similar to an aryl, a substituted aryl may have one or more aromatic rings, which rings may be fused, or connected by single bonds or connected is to other groups; however, when the substituted aryl has a heteroaromatic ring, the free valence in the substituted aryl group CaO be to a heteroatom (such as nitrogen) of the heteroaromatic ring instead of a carbon.

By "process conditions" is meant conditions for forming branched polyethylene with the types of catalysts described herein. Such conditions may include temperature, pressure, and/or oligomerization method(s), such as liquid phase, continuous, batch, and the like. Also included may be cocatalysts that are needed and/or desirable.

The "Schulz-Flory constant" or "SFC" of the mixtures of α-olefins produced is a measure of the molecular weights of the olefins obtained, usually denoted as factor K, from the Schulz-Flory theory (see for instance B. Elvers, et al., Ed. Ullmann's Encyclopedia of Industrial Chemistry, Vol. A13, VCH Verlagsgesellschaft mbH, Weinheim, 1989, pp. 243-247 and 275-276. This is defined as:

$$K=(C_{n+2}\text{olefin})/(C_n\text{olefin})$$

wherein ($C_n$ olefin) is the number of moles of olefin containing n carbon atoms, and ($C_{n+2}$ olefin) is the number of moles of olefin containing n+2 carbon atoms, or in other words the next higher oligomer of $C_n$ olefin. From this can be determined the weight (mass) and/or mole fractions of the various olefins in the resulting oligomeric reaction product mixture.

By a "copolymerization catalyst" is meant a catalyst that can readily, under the process conditions, copolymerize ethylene and α-olefins of the formula $H(CH_2CH_2)qCH=CH_2$ wherein q is an integer. Preferably the copolymerization catalyst produces a polyolefin that has a weight average molecular weight of about 5,000 or more, more preferably about 10,000 or more, and very preferably about 20,000 or more, the weight average molecular weight being measured by Size Exclusion Chromatography, using appropriate polyolefin standards for calibration.

By an "oligomerization catalyst" is meant a catalyst (system) capable of oligomerizing ethylene to a series of α-olefins.

By a "homopolyethylene" is meant a polyethylene made by feeding ethylene as the only polymerizable olefin monomer to the process. Thus, a polyethylene made in a process in which ethylene is fed to the process and some of the ethylene is converted in situ to α-olefins, which in turn are copolymerized with ethylene into the polyolefin formed, is a hornopolyethylene.

Many types of catalysts are useful as the copolymerization catalyst. For instance so-called Ziegler-Natta and/or metallocene-type catalysts may be used. These types of catalysts are well known in the polyolefin field, see for instance *Angew. Chem. Int. Ed. Engl.*, vol. 34, pp. 1143-1170 (1995), EP-A-0416815 and U.S. Pat. No. 5,198,401 for information about metallocene-type catalysts; and J. Boor Jr., *Ziegier-Alatta Catalysts and Polymerizations*, Academic Press, New York, 1979 for information about Ziegler-Natta type catalysts, all of which are hereby included by reference. Many of the useful polymerization conditions for these types of catalysts and the oligomerization catalyst coincide, so conditions for the process are easily accessible. Often a "cocatalyst" or "activator" is needed for metallocene or Ziegler-Natta type polymerizations, which cocatalyst is oftentimes the same as is sometimes needed for the oligomerization catalyst. In many instances cocatalysts or other compounds, such as an alkylaluminum compound, may be used with both types of catalysts.

Suitable catalysts for the copolymerization catalyst also include metallocene-type catalysts, as described in U.S. Pat. No. 5,324,800 and EP-A-0129368; particularly advantageous are bridged bis-indenyl metallocenes, for instance as described in U.S. Pat. No. 5,145,819 and EP-A-0485823. Another class of suitable catalysts comprises the well-known constrained geometry catalysts, as described in EP-A-0416815, EP-A-0420436, EP-A-0671404, EP-A-0643066 WO91104257. Also the class of transition metal complexes described in, for example, WO98130609, U.S. Pat. Nos. 5,880,241, 5,955,555, 6,060,569 and 5,714,556 can be used. All of the aforementioned publications are incorporated by reference herein.

Another type of catalyst which is suitable for the copolymerization catalyst is a chromium-containing catalyst. This catalyst may be a "homogenous" or "heterogeneous" type catalyst. When it is the latter it is sometimes referred to as a Phillips-type catalyst. Chromium catalysts are is also well known, see for instance E. Benham, et al., *Ethylene Polymers, HDPE* in *Encyclopedia of Polymer Science and Technology* (*online*), John Wiley & Sons, and D. M. Simpson, et al., *Ethylene Polymers, LLDPE*, in *Encyclopedia of Polymer Science and Technology* (*online*), John Wiley & Sons, both of which, as they related to chromium-containing catalysts are hereby included by reference.

The catalyst for the copolymerization of the ethylene and the α-olefin series should preferably be a catalyst that can copolymerize ethylene and α-olefins so that the relative rate of copolymerization of these two types of monomers are very roughly equal. Metallocene-type catalysts are most preferred, and preferred metallocene catalysts are those listed in previously incorporated World Patent Application 1999/150318, which is hereby included by reference.

It is to be understood that "oliogomerization catalyst" and "copolymerization catalyst" also include other compounds such as cocatalysts and/or other compounds normally used with the oliogomerization catalyst and/or copolymerization catalyst to render that particular catalyst active for the polymerization or oligomerization it is meant to carry out.

A preferred oligomerization catalyst is an iron complex of a ligand of the formula:

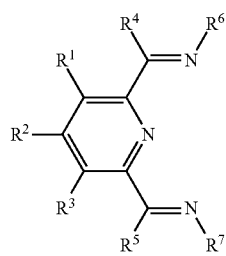

(I)

wherein: $R^1$, $R^2$, and $R^3$ are each independently hydrogen, hydrocarbyl, substituted hydrocarbyl or an inert functional group, provided that any two of $R^1$, $R^2$, and $R^3$ vicinal to one another taken together may form a ring; $R^4$ and $R^5$ are each independently hydrogen, hydrocarbyl, substituted hydrocarbyl or an inert functional group provided that $R^1$ and $R^4$ and/or $R^3$ and $R^5$ taken together may form a ring; and $R^6$ and $R^7$ are each independently aryl or substituted aryl. In another preferred form of (I), $R^1$ and $R^4$ taken together form a ring, and/or $R^3$ and $R^5$ taken together may form a ring, see U.S. Pat. No. 7,442,819.

In an iron complex of (I), (I) is usually thought of as a tridentate ligand coordinated to the iron atom through the two imino nitrogen atoms and the nitrogen atom of a pyridine ring. It is generally thought that the more sterically crowded it is about the iron atom, the higher the molecular weight of the polymerized olefin (ethylene). In order to make α-olefins, and especially to make them in a process wherein the SFC is relatively high (such as from about 0.75 to about 0.995), increased steric crowding about the iron atom is desired, when compared to oligomerization catalysts having lower SFCs (for oligomerization catalysts having lower SFCs see U.S. Pat. No. 6,103,946, World Patent Application 2005/092821, and G. J. P. Britovsek et al., *Chem. Eur. J.*, vol. 6 (No. 12), pp. 2221-2231 (2000)).

The synthesis of the ligands (I) and their iron complexes are well known, see for instance U.S. Pat. No. 6,103,946, G. J. P. Britovsek, et al., cited above, and World Patent Application WO2005/092821, and also the Examples herein.

Other relatively small aryl groups may also be used, such as 1-pyrrolyl, made from substituted or unsubstituted 1-aminopyrrole (see for instance World Patent Application 2006/0178490, which is hereby included by reference). Analogous substitution patterns to those carried out in phenyl rings may also be used to attain the desired degree of steric hindrance, and hence the desired SFC. Aryl groups containing 5-membered rings such as 1-pyrrolyl may be especially useful for obtaining the desired SFCs, since they are generally less sterically crowding than 6-membered rings. Preferred aryl groups for $R^6$ and $R^7$ are phenyl and substituted phenyl.

In an especially preferred class of such ligands (I), and specifically (IV), $R^6$ is (II) and $R^7$ is OM,

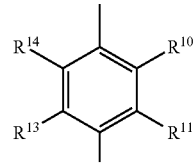

(II)

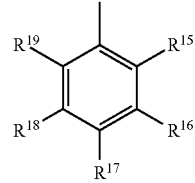

(III)

wherein $R^{10}$, $R^{14}$, and $R^{15}$ are each independently hydrocarbyl, substituted hydrocarbyl or a functional group other than fluoro, and $R^{11}$ to $R^{13}$ and $R^{16}$ to $R^{13}$ are each independently hydrogen hydrocarbyl, substituted hydrocarbyl or a functional group, and $R^{19}$ is hydrogen or fluoro, and any two of $R^{10}$ through $R^{19}$ vicinal to one another may form a ring. More preferably, in (IV) and its iron complexes, $R^{10}$, $R^{14}$, and $R^{15}$ are each independently alkyl containing 1 to 12 carbon atoms, and/or $R^{11}$ to $R^{13}$ and $R^{16}$ to $R^{19}$ are each independently hydrogen or alkyl containing 1 to 12 carbon atoms, and/or $R^1$, $R^2$, and $R^3$ are hydrogen, and/or $R^4$ and $R^5$ are both methyl or hydrogen. The iron complexes of (I) and (IV) contain only one of the ligands (I) or (IV), respectively, per iron atom present. In an especially preferred form of (IV), at least one of $R^{10}$, $R^{14}$, and $R^{15}$ is a secondary carbon group and/or a tertiary carbon group. By "and/or" in this instance is meant that one or more of $R^{10}$, $R^{14}$, and $R^{15}$ may be secondary carbon group and one or more of the same groups not secondary carbon groups may be tertiary carbon groups. For synthesis of (IV) see the Examples herein, and B. L. Small and M. Brookhart, Macromolecules, 1999, vol. 32, pp. 2120-2130 (and supporting information), which is hereby included by reference.

Other oligomerization catalysts that give Schulz-Flory constants in the desired range are known, see for instance U.S. Pat. Nos. 7,727,926 and 7,217,675, both of which are hereby included by reference. It is preferred that the oligomerization catalyst be comprised of a transition metal (including rare earths) complexes of one or more organic ligands. Preferred transition metals are Ti, Sc, Cr, Zr, the rare earth metals (lanthanides), Hf, V, Nb, Mo, Mn, Fe, to Co, Ru, Rh, Pd and Pt. In one preferred "form" Ni is not the transition metal.

By a "secondary carbon group" is meant the group:

wherein both free bonds represented by the dashed lines are to an atom or atoms other than hydrogen. These atoms or groups may be the same or different. In other words the free valences represented by the dashed lines may be hydrocarbyl, substituted hydrocarbyl or functional groups. Examples of secondary carbon groups include —CH(CH₃)₂, —CHCl₂, —CH(C₆H₅)₂, cyclohexyl, —CH(CH₃)OCH₃, and —CH=CCH₃.

By a "tertiary carbon group" is meant a group of the formula:

wherein the solid line is the bond to the benzene ring and the three free bonds represented by the dashed lines are to an atom or atoms other than hydrogen. In other words, the bonds represented by the dashed lines are to hydrocarbyl, substituted hydrocarbyl, or inert functional groups. Examples of tetiary carbon groups include —C(CH$_3$)$_3$, —C(C$_6$H$_5$)$_3$, —CCl$_3$, —C(CH$_3$)$_2$OCH$_3$, —C≡CH, —C(CH$_3$)CH=CH$_2$, and 1-adarnantyl.

The steric effect of various groups, such as alkyl groups and other groups, is well know, see for instance R. W. Taft Jr., *J. Am. Chem. Soc.*, vol. 74, pp. 3120-3128 (1952), S. H. Unger, at al., *Progress in Physical Organic Chemistry*, R. W. Taft, Ed, Vol. 12, John Wiley & Sons, Inc, New York, 1976, pp. 91-101, and *Steric Effects in Organic Chemistry*, M. S. Newman, Ed., John Wiley & Sons, New York, 1956, pp. 597-603, all of which are hereby included by reference. In the case of (I) wherein (II) and (III) are also present, one need only choose groups according to their steric hindrance based on these and other similar publications in order to produce more or less steric hindrance in the ligand and, hence, in the resulting iron complex.

While steric hindrance about the iron atom is usually the dominant item controlling the SFC, process conditions may have a lesser effect. Higher process temperatures generally give lower SFCs, while higher ethylene pressures (concentrations) generally give higher SFCs, all other conditions being equal.

The SFC of the oligomerization catalyst is in the range of from about 0.75 to about 0.995. A preferred minimum SFC is about 0.80, more preferably about 0.85, especially preferably about 0.90, very preferably about is 0.95 and very especially preferably about 0.98. A preferred maximum SFC is about 0.98, more preferably about 0.95, especially preferably about 0.90, and very preferably about 0.85. It is to be understood that any minimum preferred SFC can be combined with any maximum preferred SFC to form a preferred SFC range (including the minimum and maximum of the overall range).

It is preferred that the PE of the present invention have superior processability, and this is achieved presumably by having "long chain" branching. It is really not known how long the branches have to be in order to materially improve processability, but generally is believed that branches containing 50 to 100 carbon or more are effective. Thus the oligomerization catalyst should produce significant amounts of α-olefins, which when copolymerized produce branch lengths in the desired range of 50-100 or more carbons, in other words, α-olefins containing 50-100 carbon atoms or more should be produced in significant amounts. Table 1 shows the relationship between SFCs and the amounts of 1-olefins produced in certain ranges of carbon atom content.

made out to olefins containing 200 carbon atoms, for an SFC 0.95 olefins out to 300 carbons were calculated, and for SFCs of more than 0.95 calculations were made out to 500 carbon olefins. As can be seen for a SFC of 0.65, little or no olefin containing 50 carbon atoms or more is produced. Starting at a SFC of about 0.75 significant amounts of C50 or higher olefins are produced, and this increases as the SFC increases. For a SFC of 0.65 the α-olefins produced have relatively low molecular weight and basically a LLDPE-like polymer is produced. This is what is shown in, for instance, U.S. Pat. No. 6,586,550. As the SFC is raised proportionately lesser and lesser amounts of lower α-olefins are produced (under otherwise the same process conditions), and the amount of higher α-olefins increases.

Thus if one wants to make a PE containing relatively few short branches (for example a HDPE-like polymer) but with some long chain branching to presumably improve processability, then small amounts (relative to the copolymerization catalyst) of a copolymerization catalyst having a very high SFC, say from about 0.90 to about 0.995, more preferably from about 0.95 to about 0.995, would be used. Since it is believed only relatively small amounts of long chain branching improve processability, only a small amount of the oligomerization catalyst is needed. In this scenario, depending on copolymerization catalysts and oligomerization catalysts used, and the amount of types and branches desired, the molar ratio of copolymerization catalyst to oligomerization may typically be from about 10:1 to about 5000:1, more preferably about 20:1 to about 1,000:1

Conversely, if one wants to produce a PE containing a fair number of short chain branches, in other words a LLDPE-like PE, one could use an oligomerization catalyst with an SFC of, say, from about 0.75 to about 0.85, perhaps in somewhat higher amounts to achieve the short chain branching desired, while also obtaining long chain branching in the PE. These general to statements assume, to some extent, that the reactivity of the α-olefins of various molecular weights that are produced by the oligomerization catalyst are roughly the same (on a molar basis) with the copolymerization catalyst. For any particular process system this may be checked by routine experimentation. In this scenario, depending on copolymerization catalysts and oligomerization catalysts used and the amount of types and branches desired, the molar ratio of copolymerization catalyst to oligomerization may typically be from about 5:1 to about 100:1, more preferably from about 10:1 to about 50:1. However, as noted above, this will depend

TABLE 1

| SF Constant | 0.65 | 0.75 | 0.85 | 0.95 | 0.98 | 0.99 | 0.995 |
|---|---|---|---|---|---|---|---|
| Mole percent | | | | | | | |
| C50-C100 | 0.00 | 0.13 | 2.35 | 22.65 | 25.84 | 19.88 | 15.27 |
| C50-C200 | 0.00 | 0.13 | 2.38 | 30.13 | 49.63 | 46.17 | 39.59 |
| C50-C300 | 0.00 | 0.13 | 2.38 | 30.70 | 58.29 | 62.08 | 58.53 |
| C50-C400 | 0.00 | 0.13 | 2.38 | 30.70 | 61.44 | 71.70 | 73.26 |
| C50-C500 | 0.00 | 0.13 | 2.38 | 30.70 | 62.59 | 77.52 | 84.87 |
| C100-C200 | 0.00 | 0.00 | 0.04 | 7.91 | 24.55 | 26.91 | 24.87 |
| Weight Percent | | | | | | | |
| C4-C50 | 99.98 | 99.56 | 92.95 | 40.48 | 10.94 | 4.34 | 2.36 |
| C4-C100 | 100.00 | 100.00 | 99.79 | 74.91 | 29.59 | 13.63 | 8.03 |

These calculations are fairly exact, using the equation given for the SFC above and other standard stoichiometric calculations. The calculations for SFCs of 0.65 to 0.85 were on several factors and the process conditions needed to produce the desired product are readily determined by routine experimentation.

Under a given set of process conditions, generally with a higher molar ratio of oligomerization catalyst to copolymerization catalyst, incorporation of the α-olefins in the PE produced is increased. This is true because increasing the relative concentration of oligomerization catalyst present in turn increases the amount of α-olefins that will be produced for a given amount of polymerization. As a result, the concentration of α-olefins in the process will be higher, particularly under equilibrium conditions in a continuous process.

Since the process conditions useful for many of the various copolymerizations and oligomerization catalysts overlap, process conditions will usually be in this area of overlap, see for instance U.S. Pat. Nos. 6,297,338, 6,620,895, and 6,555, 631 for more details about process conditions in which the oligomerization (but with lower SFCs) and copolymerization catalysts are present. Process conditions for lower SFC oligomerization catalysts are approximately the same for the higher SFC oligomerization catalysts of this invention Useful process conditions for complexes of (I) are found in U.S. Pat. No. 6,103,946, and G. J. P. Britovsek, et al., cited above, all of which are hereby included by reference. Useful process conditions for copolymerization catalysts such as metallocene catalysts and Ziegler-Natta catalysts are well known in the art.

In typical commercial processes for making PE, the catalyst is often supported on a particulate material (a "support"). Typical supports are silica, alumina, clay, and inorganic salts such as $MgCl_2$. One or both, preferably both, of the copolymerization catalyst and the oligomerization catalyst may be supported. They may be supported separately on the same or on two different supports, or both may be supported on the same support particles. It is preferred for both catalysts to be supported on the same support particle. Supportation of polymerization/oligomerization catalyst for olefins is well known in the art, and described in many of the above cited references.

Besides the oligomerization and copolymerization catalysts, other "types" of catalysts and/or other compounds may also be present. For instance, a catalyst that readily homopolymerizes ethylene but does not readily copolymerize α-olefins may be present so that the polymeric product is a blend of a branched polyethylene and an essentially unbranched polyethylene. Such a process is described in U.S. Pat. No. 6,555, 631, which is hereby included by reference. Again process conditions are approximately the same for the present process. By a catalyst that homopolymerizes ethylene but does not readily copolymerize ethylene and α-olefins is meant a catalyst that under process conditions copolymerizes 10 mole percent or less, more preferably 5 mole percent or less, of the amount of α-olefins copolymerized by the copolymerization catalyst present. This may be readily determined by running the process with just the copolymerization catalyst or the catalyst that does not copolymerize α-olefins readily, each in the presence of the oligomerization catalyst, and comparing the branching levels of the polyethylenes produced. Another catalyst that may be present is another copolymerization catalyst, that may, for instance, give a different molecular weight branched polyethylene as a product. Thus a product containing branched polyethylene with a broad molecular weight distribution may be obtained. Other combinations will be evident to the artisan. Other types of compounds that may also be present are lower α-olefins (containing 4 to about 14 carbon atoms) and/or other olefins that may be copolymerized by the copolymerization catalyst. Thus, if it is desired to make an LLDPE-type polymer, it can be done by using an oligomerization catalyst that has a very high SFC, and that consequently does not produce much lower α-olefins, and "supplementing" the amount of shorter branches that are obtained by adding one or more lower α-olefins. The use of a second oligomerization catalyst with an SFC of about 0.30 to about 0.70 will also produce a PE with higher shorter branch content. This may be used with, or in lieu of, adding lower aa olefin(s) to the reactor.

The branched PE produced by the present process usually has branches of the formula $—CH_2CH_2(CH_2CH_2)_qH$ wherein q is an integer. The is branching levels, defined as the number of methyl groups per 1,000 methylene groups in the polyolefin, may range from about 0.1 to about 150, excluding end groups. Branching levels may be readily measured by NMR spectroscopy, see for instance World Patent Application 1996/023010. The densities of these branched polyolefins may range from about 0.85 to about 0.96 g/cc, depending on the branching level. The polymers may range from elastomers to plastomers to LLDPE to medium density polyethylene to essentially high density polyethylene, these being ordered from high to low branching levels, and low to high densities. The difference between the structure of these PEs and previous PEs is that they contain long chain branches (say containing 50 or more carbon atoms) derived from the higher α-olefins produced by the oligomerization catalyst. Unfortunately, to Applicants' knowledge, the length, and to some extent the amount, of branches containing more than about 10 carbon atoms can't be readily determined, and long chain branching is usually inferred from the PE's properties, for example the viscoelastic properties. Another difference between these PEs and LOPE is that LOPE contains short chain branching, especially short chain branches where the branches have an odd number of carbon atoms, i.e., branches such as n-propyl and n-amyl (n-pentyl). The PEs of the present invention preferably do not contain branches (this excludes end groups) having an odd number of carbon atoms unless an olefin containing an odd number of carbon atoms such as propylene or 1-pentene is added to the polymerization process, in another preferred form, the amount of methyl branches (not including end groups) is fewer than about 2.0 per 1,000 methylene groups, more preferably fewer than about 1.0 and very preferably fewer than about 0.5, and/or the amount of n-propyl branches is fewer than about 2.0 per 1,000 methylene groups, more preferably fewer than about 1.0 and very preferably fewer than about 0.5, and/or the amount of n-amyl branches is fewer than about 2.0 per 1,000 methylene groups, more preferably fewer than about 1.0 and very preferably fewer than about 0.5.

Since it is difficult to measure long chain branching directly (see above), its presence is usually inferred by the resulting polyolefin's properties, in particular its rheological properties. The desirability of having long chain branching is described in U.S. Pat. No. 6,420,507, which is hereby included by reference. One rheological property which differs from polyolefins containing few or no long chain branches is that the polymer melt viscosity is more dependent on the shear rate at which that viscosity is measured. Sometimes this is referred to as "shear thinning," that is the apparent viscosity decreases as the shear rate is increased. While this happens to most polyolefins, it is often more pronounced in polyolefins that are believed to have long chain branching. One method of measuring this is using the so-called "melt index ratio method." The melt index is a test (ASTM D1238-04c) in which molten polyolefin is forced through an orifice by the force of a certain weight on a piston. Increasing the weight on the piston increases the shear rate on the polyolefin. One runs the test using two different weights, for instance the "standard" 2.16 kg and 21 kg, and uses the ratio of $I_{21}/I_2$ (the ratio of the melt index at 21 kg divided by the melt index at 2.16 kg) or sometimes, for instance, $I_{10}/I_2$. At larger ratios, more shear thinning occurs, and presumably, the processability of the polyolefin is enhanced. These methods are illustrated in U.S. Pat. Nos. 7,153,909 and 7,560,524, both of which are hereby included by reference.

Another method for measuring such rheological differences is illustrated in U.S. Pat. No. 6,586,550, which is hereby included by reference. The homopolyethylenes of this patent also have unusual properties, which gives them much better processability in processes in which high low shear viscosity and/or low high shear viscose is desirable. For instance, some of the polymers produced by the polymerization herein have unusual rheological properties that make them suitable for the uses described herein. Using the data shown in FIG. 1 of the patent, one can calculate certain indices that reflect the improved processing properties. A structural index, $S_T$, which is defined as:

$$S_T = \eta_0/(8.33 \times 10^{-14})(M_w)^{3.4}$$

wherein $\eta_0$ is the zero shear viscosity at 140° C. and $M_w$ is the weight average molecular weight of the polymer. Materials that have a large proportion of carbon atoms in long chain branches as opposed to short chain branches will often have a relatively high $S_T$. Preferably the polymer made herein have an $S_T$ of about 1.4 or more, more preferably about 2.0 or more.

Another index described in U.S. Pat. No. 6,586,550 which may be used to measure the potential good processability of a polymer, based on its rheological properties, is $P_R$, the Processability Index. This is a shear thinning index, and is defined as:

$$P_R = (\eta^* \text{ at } 0.00628 \text{ rad/s})/(\eta^* \text{ at } 188 \text{ rad/s})$$

wherein $\eta^*$ is the viscosity at the indicated rate of the viscometer. This is similar to other ratios of viscosities at different shear levels, but covers a broader range of shear rates. Higher $P_R$ values result in increased shear thinning of the polymer. It is preferred that $P_R$ of the polymers used herein be about 40 or more, more preferably about 50 or more, and especially preferably about 100 or more. Furthermore, any combination of $S_T$ and $P_R$ values mentioned herein are also preferred.

Polymers having the $S_T$ and/or $P_R$ values described above may also have relatively high densities compared to similar previously made polymers. This especially so if an oligomerization catalyst having a relatively high SFC is used, since proportionately fewer lower α-olefins are made and incorporated into the PE. Thus the density of the PE may be about 0.930 or more, more preferably about 0.935 or more, very preferably about 0.940 or more and especially preferably about 0.945 or more. Density is measured by the method described in U.S. Pat. No. 6,586,550 at column 29, lines 13-25. A preferred upper density is about 0.98.

Another property of the polymers having the $S_T$ and/or $P_R$ values described above is the ratio of hexyl and longer branches (Hex+) to n-butyl (Bu) and/or ethyl (Et) branches. It is to be noted that Hex+ in this measurement includes the ends of chains, while n-butyl and ethyl branches do not include the ends of chains. These limits are preferably applicable to PEs having a number average molecular weight (determined by Size Exclusion Chromatography, as described above) of about 15,000 or more, to preferably 20,000 or more. Thus it is preferred that the Hex+/Bu ratio is about 4.0 or more, more preferably about 6.0 or more and very preferably about 8.0 or more. It is also preferred that the Hex+/Et ratio is about 4.0 or more, more preferably about 6.0 or more, and very preferably about 8.0 or more. Branching levels may be measured by $^{13}C$ nmr as described in World Patent Application 96/23010, which is hereby included by reference. It is to be understood that any of these preferred structural features, densities, and/or rheological properties ($S_T$ and/or $P_R$) may be combined to form a preferred set of properties for a PE.

As described in U.S. Pat. No. 6,586,550, another way of finding polymers that may have good rheology (and possibly long chain branching) is by measuring the Mw versus the intrinsic viscosity. Polymers with good processing characteristics will have a lower intrinsic viscosity for a given Mw versus a (possibly more linear) worse processing polymer. This is shown in FIG. 2 of U.S. Pat. No. 6,586,550, and explained in that patent.

The polymers of the present invention may be made by any process in which it is useful to make a branched polyethylene by copolymerizing ethylene with one or more α-olefins of the formula $H(CH_2)_sCH=CH_2$, wherein s is an integer of 1 to 10 (the typical olefins previously used for this purpose). Thus, useful processes will include gas phase, and liquid phase including slurry (loop) and solution processes. Which process is useful for any particular type of product is determined in part by the properties of the product. For example, elastomer and plastomers are often made in solution processes, while polymers that have higher melting points are often made in gas phase or slurry processes. Continuous processes are preferred. AH of these processes are well known in the art, for instance for LLDPE see D. M. Simpson & G. A. Vaughan, "*Ethylene polymers, LLDPE Encyclopedia of Polymer Science and Technology*, Vol. 2, John Wiley & Sons, New York, (online) 2005), pp. 441-482. Processes for other polyolefin types of products are equally well known.

An important part of the process in this instance, and in other processes in which α-olefins such as 1-hexene and/or 1-octene, for instance, are added to the polymerization, is removal of unpolymerized olefins from the polymeric product. When using an oligomerization catalyst with a very high SFC, relatively small amounts of lower, relatively volatile, α-olefins are produced. Thus, methods used to remove olefins such as 1-hexene and 1-octene, as used for instance-in processes to make LLDPE, are applicable to the present process. In gas phase processes these olefins may be removed in the resin degassing step. For solution processes they may be removed in the extruder, which removes solvent. In slurry processes they may be removed in the flasher and dryer. In addition, final "traces" of these olefins may be removed in any of these processes in the extruder (which usually feeds a pelletizer at the end of the production line) by adding vacuum ports to that extruder. If a high SFC oligomerization catalyst is used, there may be some unreacted higher α-olefins in the PE product. Sometimes these are called PE waxes, and may be deleterious to product properties. There are methods for "dewaxing" PE polymers, but as noted above, in such a process only small amounts of such higher α-olefins need be produced to improve processability, so dewaxing may not be needed.

The unpolymerized α-olefins that are removed from the polymer stream may be purified and recycled back into the polymerization and/or used other processes and/or sold and/or burned. For recycle, the recovered α-olefins may be separated into "pure" compounds or returned to the polymerization as a mixture of α-olefins.

The polyolefins produced by this process are useful (depending on their branching level) as molding resins for containers, pipes, mechanical parts, and other uses, packages, packaging films, electrical insulation, adhesives, elastomers, rigid or flexible foams, etc.

Due to the good processing properties of many of the polyethylenes produced by the process described herein, they may be advantageously formed by a variety of melt forming methods. These melt forming methods are well known in the art, and some of the polyethylenes described herein are especially well suited to many of these methods. These include injection molding, extrusion (including simple film and sheet extrusion), blown film extrusion, and blow molding (including extrusion blow molding, injection blow molding, and stretch blow molding, and variations thereof). These and other forming processes result in shaped articles, that is, articles having a definite desired shape.

As mentioned above many of the polyolefins produced by the present process have good processability. It is also known in the field of polyethylenes that generally the higher the density or crystallinity of the PE generally, the lower the water vapor transmission and oxygen transmission rates, and the higher the tensile and tear strengths (see for instance J. Krohn, at al., *Factors Affecting the Permeability of Blown PE Films*, Proceedings of the SPE Annual Technical Conference & Exhibits, ANTEC '97, p. 1654-1658, and D. S. Chiu et. al., *Tear Strength of Polyethylene*, Journal of Materials Science, Vol. 19, p. 2622.2632 (1984, both of which are hereby included by reference). This is an excellent combination of properties, especially for use as packaging, or other sealed containers, which also includes containers that preferably do not release their contents to the exterior and/or absorb items on the exterior of the container, such as flexible or rigid pipe or tubing, flexible bag or pouch, etc. Even if the container is not sealed, because of the better physical properties (tensile and/or tear strength for example) it may be advantageous to use these polyolefins because at a given thickness the bag may be stronger, or it may be possible to reduce the bag thickness while maintaining better equivalent physical properties. Examples of useful types of bags that may be made are garbage bags, carry-out (grocery) bags, food packaging bags, drum liners, and pouches (for example a pouch for storing food). Many of these containers are considered flexible packaging (see for instance J. Wooster, *Flexible Packaging*, Encyclopedia of Polymer Science and Engineering, John Wiley & Sons, available online as DOI 10, 1002/0471440264.pst228, (2001)). Many of these types of packages are made from film (usually extruded and blown) or (often extruded) sheet, making film and sheet of the currently made polyolefins especially valuable.

In order to measure the SFC of the oligomerization catalyst during the manufacture of the branched polyethylene, the process is carried out using the same conditions as the process to produce the branched polyethylene, but the copolymerization catalyst is omitted and any cocatalysts are scaled back in relationship to the total amount of oligomerization catalyst present compared to the total of the copolymerization catalyst and oligomerization catalyst usually used. However, it is to be noted that cocatalyst(s) used, such as an alkylaluminum compound, may have to be used in amounts greater than normally used, in order to remove traces of any process poisons, such as water, that are present. For an oligomerization catalyst of the present invention with a relatively low SFC, say from about 0.75 to about 0.90, the resulting mixture of α-olefins is analyzed to determine their molecular ratios, and this is most conveniently done by standard gas chromatography using appropriate standards for calibration. Preferably the ratios (as defined by the equation for "K", above) between olefins from $C_6$ to $C_{30}$ (if possible) are each measured and then averaged to obtain the SFC. If the ratios of higher olefins, such as $C_{20}$ to $C_{30}$ are too small to measure accurately, they may be omitted from the calculation of the constant. For oligomerization catalysts with higher SFCs, say >0.90, it may not be possible to accurately measure the constant from just the olefins up to about $C_{30}$, since the concentration change from olefin to olefin is relatively small and a broader range may be needed to accurately measure the SFC, i.e., higher olefins need to be measured. Such higher olefins are not very volatile, and it may be advantageous to use liquid chromatography (possibly combined with mass spectroscopy to measure what is the particular olefin being eluted), again using appropriate standards for calibration.

In the Examples THF is tetrahydrofuran.

Example 1

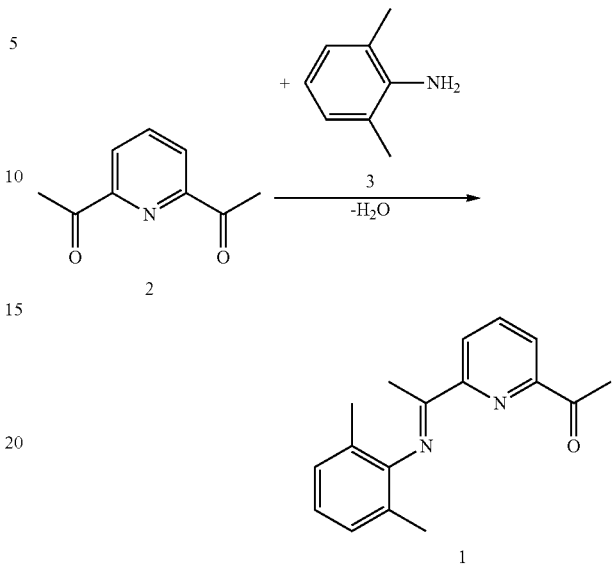

1-{6-[1-(2,6-Dimethyl-phenylimino)-ethyl]-pyridin-2-yl}-ethanone (1)

1-(6-Acetyl-pyridin-2-yl)-ethanone 2 (22.2 g, 0.0136 mole), 15.0 g (0.124 mol) of 2,6-dimethyl-phenylamine 3, 300 ml of n-propanol, and a few crystals of p-toluenesulfonic acid were stirred at room temperature for 36 h in 500 ml flask under a flow of nitrogen. The resultant yellow precipitate was filtered and washed by 20 ml of methanol. It was then dried at 1-mm vacuum overnight. The yield of 1-{6-[1-(2,6-dimethyl-phenylimino)-ethyl]-pyridin-2-yl}-ethanone 1 was 12.86 g (39%) as a yellow solid. $^1$H NMR (500 MHz, $CD_2Cl_2$, TMS): δ 2.00 (s, 6H, Me), 2.20 (s, 3H, Me), 2.70 (s, 3H, Me), 6.90 (t, $^3J_{HH}$=8.1 Hz, 1H, Arom-H), 7.10 (d, $^3J_{HH}$=8.1 Hz, 2H, Arom-H), 7.95 (t, $^3J_{HH}$=8.0 Hz, 1H, Pyr-H), 8.10 (d, $^3J_{HH}$=8.0 Hz, 1H, Py-H), 8.55 (d, $^3J_{HH}$=8.0 Hz, 1H, Py-H). $^{13}$C NMR (500 MHz, $CD_2Cl_2$, TMS (selected signals)): δ 167.1 (C=N), 200.1 (O=O). Anal. Calculated for $C_{17}H_{13}N_2O$ (Mol. Wt.: 266.34): C, 76.66; H, 6.81; N, 10.52. Found: C, 76.69; H, 6.84; N, 10.57.

Example 2

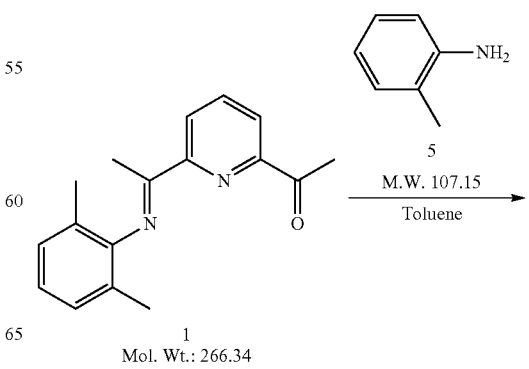

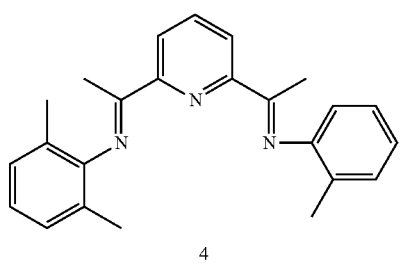

4

(2,6-Dimethyl-phenyl)-{1-[6-(1-o-tolylimino-ethyl)-pyridin-2-yl]-ethylidene}-amine (4)

5.0 g (0.0188 mol) of 1-{6-[1-(2,6-Dimethyl-phenylimino)-ethyl]-pyridin-2-yl}-ethanone 1 (5.0 g, 0.0188 mol), 2.62 g (0.02445 mol) of ortho-tolylamine 5, 100 g of fresh molecular sieves, and 100 ml of toluene were kept at 100° C. for 3 days under the flow of nitrogen. The solvent was removed in a rotary evaporator and the residue was recrystallized from 20 ml of ethanol. The yield of (2,6-dimethyl-phenyl)-{1-[6-(1-o-tolylimino-ethyl)-pyridin-2-yl]-ethylidene}-amine 4 was 4.74 g (71%) as a yellow solid.

Example 3

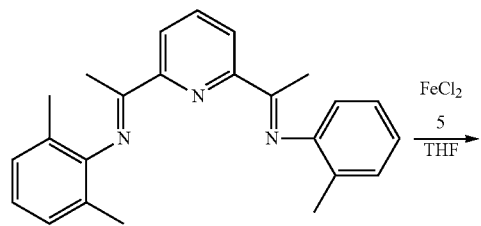

(2,6-Dimethyl-phenyl)-{1-[6-(1-o-tolylimino-ethyl)-pyridin-2-yl]-ethylidene}-amine iron (II) chloride (7)

(2,6-Dimethyl-phenyl)-{1-[6-(1-o-tolylimino-ethyl)-pyridin-2-yl]-ethylidene}-amine 4 (1.0 g, 0.00281 mol) was added in one portion to the suspension of 0.33 g (0.0026 mol) of iron (II) chloride in 30 ml of THF at ambient temperature in nitrogen glove box. The reaction mixture was stirred for 12 hours additionally. The resultant blue solid was filtered and washed by 50 ml of pentanes three times and dried under 1-mm vacuum overnight. The yield of (2,6-dimethyl-phenyl)-{1-[6-(1-o-tolylimino-ethyl)-pyridin-2-yl]-ethylidene}-amine iron (II) chloride 7 was 1.04 g (83%).

Example 4

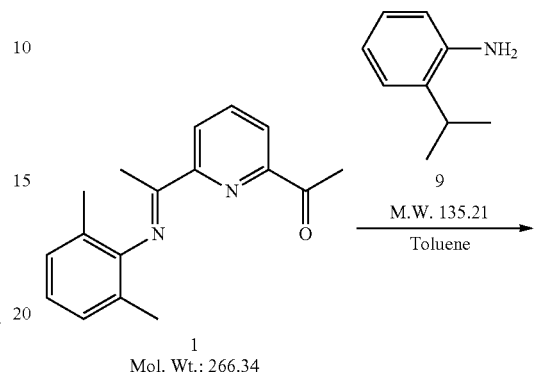

(2,6-Dimethyl-phenyl)-(1-{6-[1-(2-isopropyl-phenylimino)-ethyl]-pyridin-2-yl}-ethylidene)-amine (8)

1-{6-[1-(2,6-Dimethyl-phenylimino)-ethyl]-pyridin-2-yl}-ethanone 1 (5.0 g, 0.0188 mol). 3.30 g (0.0244 mol) of 2-isopropyl-phenylamine 9, 100 g of fresh molecular sieves, and 100 ml of toluene were kept at 100° C. for 3 days under a flow of nitrogen. The solvent was removed in a rotary evaporator and the residue was recrystallized from 20 ml of ethanol. The yield of (2,6-dimethyl-phenyl)-(1-{6-[1-(2-isopropyl-phenylimino)-ethyl]-pyridin-2-yl}-ethylidene)-amine 8 was 4.90 g (68%) as a yellow solid.

Example 5

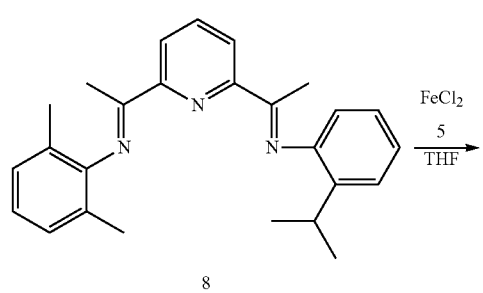

-continued

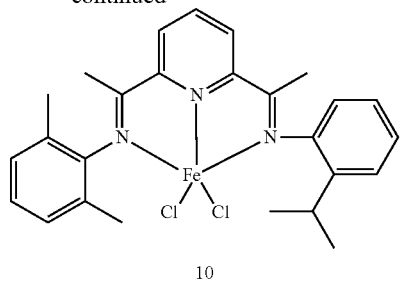

10

(2,6-Dimethyl-phenyl)-(1-{6-[1-(2-isopropyl-phenylimino)-ethyl]-pyridin-2-yl}-ethylidene)-amine iron (II) chloride (10)

(2,6-Dimethyl-phenyl)-(1-{6-[1-(2-isopropyl-phenylimino)-ethyl]-pyridin-2-yl}-ethylidene)-amine 8 (1.0 g, 0.0026 mol) was added in one portion to the suspension of 0.31 g (0.0025 mol) of iron (II) chloride in 50 ml of THF at ambient temperature in nitrogen glove box. The reaction mixture was stirred for 12 h. The resultant blue solid was filtered and washed by 50 ml of pentanes three times and dried under 1-mm vacuum overnight. The yield of (2,6-dimethyl-phenyl)-(1-{6-[1-(2-isopropyl-phenylimino)-ethyl]-pyridin-2-yl}-ethylidene)-amine iron (II) chloride 10 was 1.06 g (85%).

Example 6

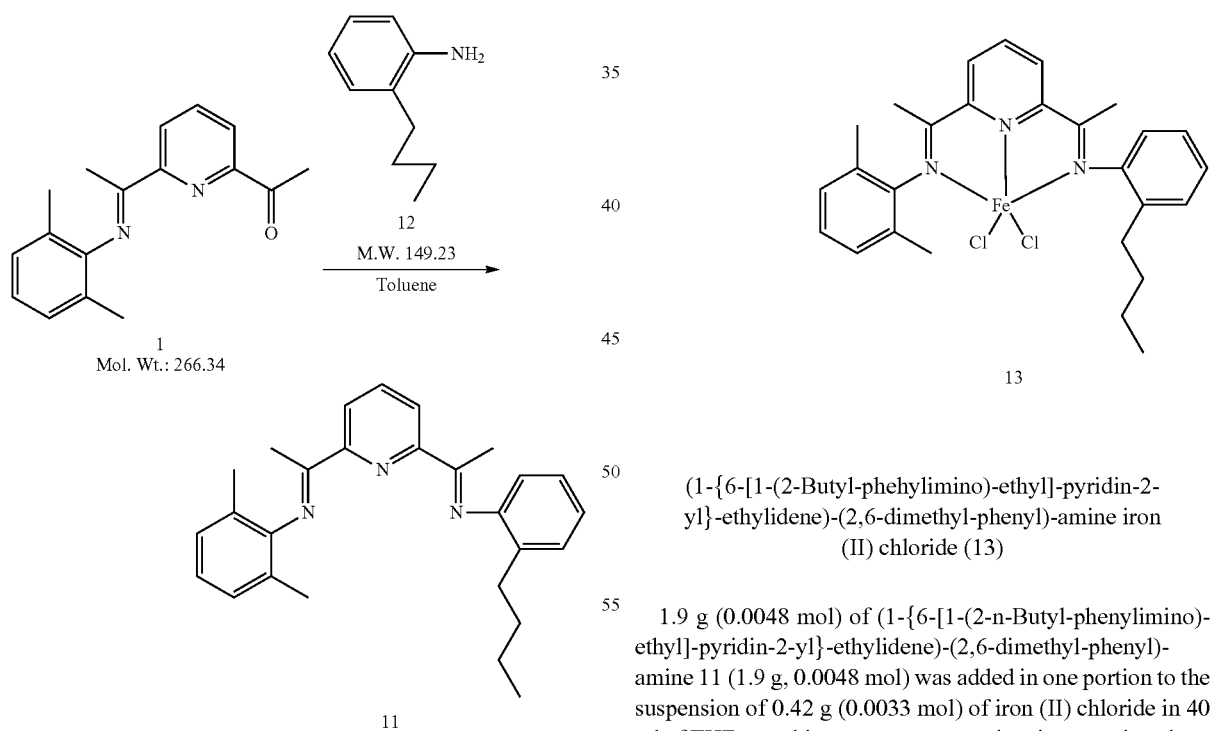

(1-{6-[1-(2-Butyl-phenylimino)-ethyl]-pyridin-2-yl}-ethylidene)-(2,6-dimethyl-phenyl)-amine (11)

1-{6-[1-(2,6-Dimethyl-phenylimino)-ethyl]-pyridin-2-yl}-ethanone 1 (2.3 g, 0.0088 mol), 1.68 g (0.0244 mol) of 2-n-Butyl-phenylamine 12, 100 g of fresh molecular sieves, and 100 ml of toluene were kept at 100° C. for 3 days under the flow of nitrogen. The solvent was removed in a rotary evaporator and the residue was recrystallized from 5 ml of ethanol. The yield of (1-{6-[1-(2-n-butyl-phenylimino)-ethyl]-pyridin-2-yl}-ethylidene)-(2,6-dimethyl-phenyl)-amine 11 was 2.60 g (76%) as a yellow solid. $^{13}$C NMR (500 MHz, CD$_2$Cl$_2$, TMS (selected signals)): δ 166.8 (C=N), 166.1 (C=N).

Example 7

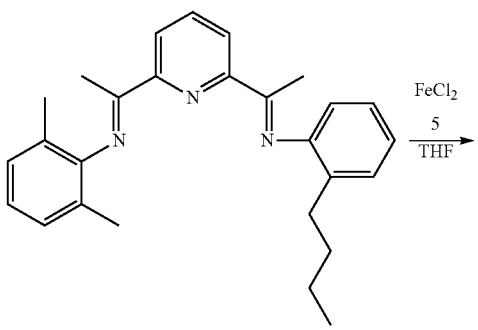

(1-{6-[1-(2-Butyl-phehylimino)-ethyl]-pyridin-2-yl}-ethylidene)-(2,6-dimethyl-phenyl)-amine iron (II) chloride (13)

1.9 g (0.0048 mol) of (1-{6-[1-(2-n-Butyl-phenylimino)-ethyl]-pyridin-2-yl}-ethylidene)-(2,6-dimethyl-phenyl)-amine 11 (1.9 g, 0.0048 mol) was added in one portion to the suspension of 0.42 g (0.0033 mol) of iron (II) chloride in 40 ml of THF at ambient temperature under nitrogen glove box. The reaction mixture was stirred for 12 h. The resultant blue solid was filtered and washed by 50 ml of pentanes three times and dried under 1-mm vacuum overnight. The yield of (1-{6-[1-(2-n-butyl-phenylimino)-ethyl]-pyridin-2-yl}-ethylidene)-(2,6-dimethyl-phenyl)amine iron (II) chloride 13 was 1.37 g (79%).

Example 8

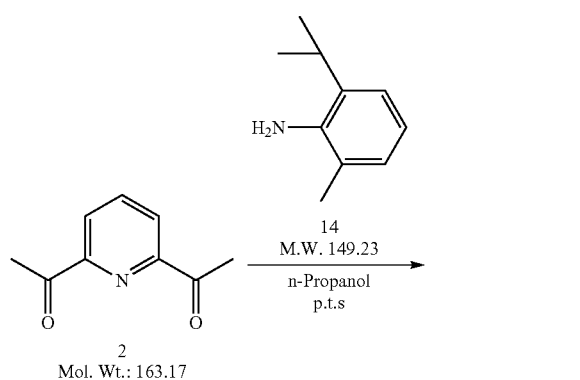

1-{6-[1-(2-Isopropyl-6-methyl-phenylimino)-ethyl]-pyridin-2-yl}-ethanone (15)

1-(6-Acetyl-pyridin-2-yl)-ethanone 2 (35.54 g, 0.22 mol), 25.0 g (0.168 mol) of 2-Isopropyl-6-methyl-phenylamine 14, 350 ml of n-propanol, and a few crystals of p-toluenesulfonic acid were stirred at room temperature for 36 h in a 500 ml flask under a flow of the nitrogen. The resultant yellow precipitate was filtered and washed by 20 ml of methanol. It was then dried at 1-mm vacuum overnight. The yield of 1-{6-[1-(2-Isopropyl-6-methyl-phenylimino)-ethyl]-pyridin-2-yl}-ethanone 15 was 13.35 g (27%) as a yellow solid.

Example 9

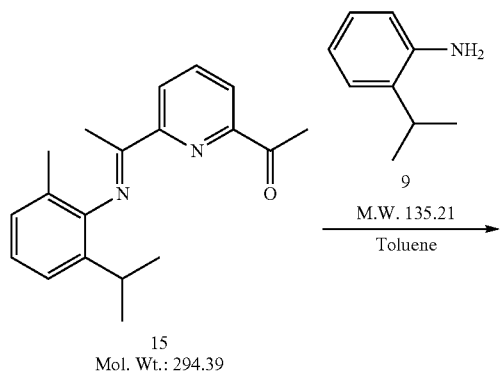

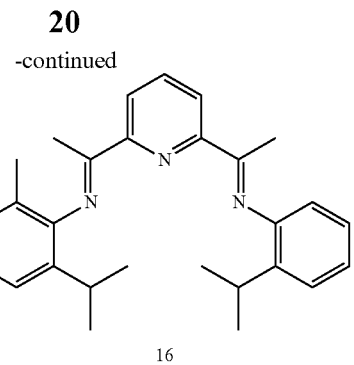

(2-Isopropyl-6-methyl-phenyl)-(1-{6-[1-(2-isopropyl-phenylimino)-ethyl]-pyridin-2-yl}-ethylidene)-amine (16)

4.0 g (0.0135 mol) of 1-{6-[1-(2-isopropyl-6-methyl-phenylimino)-ethyl]-pyridin-2-yl}-ethanone 15, 2.76 g (0.0204 mol) of 2-Isopropyl-phenylamine 9 (4.0 g, 0.0135 mol), 100 g of fresh molecular sieves, and 100 ml of toluene were kept at 100° C. for 3 days under a flow of nitrogen. The solvent was removed in a rotary evaporator and the residue was recrystallized from 10 ml of ethanol. The yield of (2-Isopropyl-6-methyl-phenyl)-(1-{6-[1-(2-isopropyl-phenylimino)-ethyl]-pyridin-2-yl}-ethylidene)-amine 16 was 4.83 g (87%) as a yellow solid. $^{13}$C NMR (500 MHz, CD$_2$Cl$_2$, TMS (selected signals)), δ 166.9 (C=N), 166.2 (C=N).

Example 10

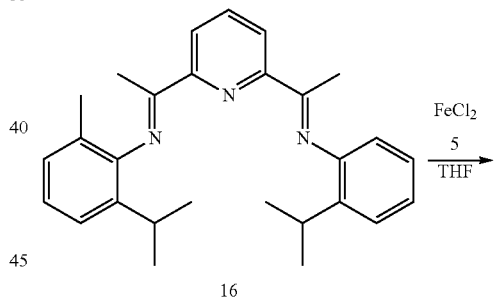

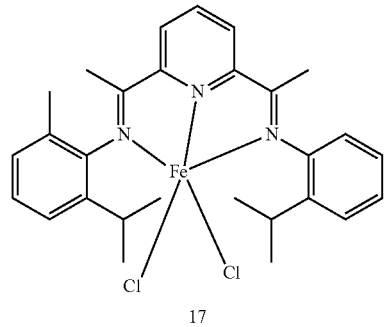

(2-Isopropyl-6-methyl-phenyl)-(1-{6-[1-(2-isopropyl-phenylimino)-ethyl]-pyridin-2-yl}-ethylidene)-amine iron (II) chloride (17)

2.42 g (0.0059 mol) of (2-Isopropyl-6-methyl-phenyl)-(1-{6-[1-(2-isopropyl-phenylimino)-ethyl]-pyridin-2-yl}-ethylidene)-amine 16 (2.42 g, 0.0059 mol) was added in one portion to the suspension of 0.71 g (0.0056 mol) of iron (II) chloride in 40 ml of THF at ambient temperature under nitrogen glove box. The reaction mixture was stirred for 12 h. The resultant blue solid was filtered and washed by 50 ml of pentanes three times and dried under 1-mm vacuum overnight. The yield of (2-isopropyl-6-methyl-phenyl)-(1-{6-[1-(2-isopropyl-phenylimino)-ethyl]-pyridin-2-yl}-ethylidene)-amine iron (II) chloride 17 was 2.29 g (76%).

Example 11

The iron complexes made in Examples 3, 5, 7 and 10 were used to oligomerize ethylene. The oligomerizations were run in a 1 l Autoclave Engineering Zipperclavet® recirculating batch reactor using 700 ml of o-xylene as the solvent The iron complexes were activated using modified methylaluminoxane 3A, and ratios of the aluminoxane to Fe (Al/Fe) are given in Table 2. In all cases there was a very large excess of the aluminoxane. After 30-60 min the oligomerization was quenched by decreasing the ethylene pressure and cooling the reactor by passing cold water through the jacket. The SFCs were obtained in the standard manner by analyzing the process mixture by chromatography for α-olefins, measuring those olefins having 4 to about 30 carbon atoms, and using appropriate standards and corrections factors, calculating the amount of each olefin and then calculating the best fit SFC. Temperatures at which the oligomerizations were carried out and the resulting SFCs are given in Table 2.

TABLE 2

| Iron Complex | Temp, °C. | Al/Fe | SFC |
|---|---|---|---|
| 7 | 85 | 10,740 | 0.86 |
| 10 | 120 | 2,880 | 0.82 |
|  | 100 | 7,190 | 0.80 |
| 13 | 85 | 37,100 | — |
| 17 | 85 | 24,640 | 0.85 |

It is believed the SFC for 13 was fairly high since only relatively very small amounts of lower α-olefins were believed present.

The present invention is not limited to the embodiments described and exemplified above, but is capable of variation and modification without departure from the scope of the appended claims.

What is claimed is:

1. A polyethylene having a structural index, $S_T$, of about 1.4 or more and/or a processability index, $P_R$, of about 40 or more, and wherein said polyethylene has a density of 0.935 or more, and said polyethylene contains ethyl, n-butyl, and hexyl and longer branches.

2. The polyethylene as recited in claim 1 wherein, said $S_T$ is about 2.0 or more, said $P_R$ is about 100 or more, and said density is 0.945 or more.

3. The polyethylene as recited in claim 1 wherein there are less than about 2.0 methyl branches per 1000 methylene groups and fewer than about 2.0 n-amyl groups per 1000 methylene groups.

4. The polyethylene as recited in claim 3 which is a homopolyethylene.

5. The polyethylene as recited in claim 1 wherein there are less than about 0.5 n-amyl groups per 1000 methylene groups.

6. The polyethylene as recited in claim 1 which is a homopolyethylene.

7. A film or sheet comprising the polyethylene of claim 1.

8. A film or sheet comprising the polyethylene of claim 3.

9. A shaped article comprising the polyethylene of claim 1.

10. A shaped article comprising the polyethylene of claim 3.

11. A polyethylene having a structural index, $S_T$, of about 1.4 or more and/or a processability index, $P_R$, of about 40 or more, wherein at least one or both of the following are true:
(a) the ratio of Hex+/Bu is about 4.0 or more;
(b) the ratio of Hex+/Et is about 4.0 or more;
and wherein said polyethylene has a number average molecular weight of about 15,000 or more, and said polyethylene contains ethyl, n-butyl, and hexyl and longer branches.

12. The polyethylene as recited in claim 11 wherein there are less than about 2.0 methyl branches per 1000 methylene groups and fewer than about 2.0 n-amyl groups per 1000 methylene groups.

13. The polyethylene as recited in claim 12 which is a homopolyethylene.

14. The polyethylene as recited in claim 11 wherein there are less than about 0.5 n-amyl groups per 1000 methylene groups.

15. The polyethylene as recited in claim 11 which is a homopolyethylene.

16. A film or sheet comprising the polyethylene of claim 11.

17. A film or sheet comprising the polyethylene of claim 12.

18. A shaped article comprising the polyethylene of claim 11.

19. A shaped article comprising the polyethylene of claim 12.

20. A process for the manufacture of a branched polyethylene, comprising, contacting ethylene with a copolymerization catalyst, and an ethylene oligomerization catalyst which produces a series of α-olefins, wherein the improvement comprises, said oligomerization catalyst which produces said series of α-olefins has a Schulz-Flory constant of about 0.80 to 0.995 under process conditions, and wherein a branched polyethylene produced by said process has a density of 0.930 or more.

21. The process as described in claim 20 wherein said Schulz-Flory constant is about 0.80 to about 0.98.

22. The process as described in claim 20 wherein said Schulz-Flory constant is about 0.85 to about 0.98.

23. The process as described in claim 20 wherein said oligomerization catalyst is an iron complex of a ligand of the formula

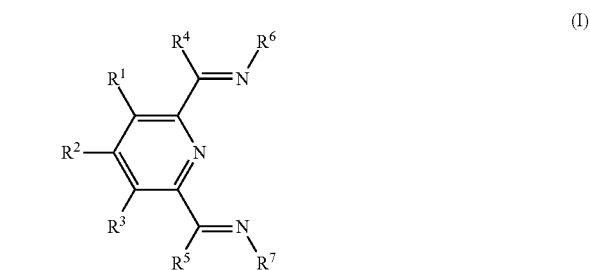

wherein: $R^1$, $R^2$ and $R^3$ are each independently hydrogen, hydrocarbyl, substituted hydrocarbyl or an inert functional group, provided that any two of $R^1$, $R^2$ and $R^3$ vicinal to one another taken together may form a ring; $R^4$ and $R^5$ are each independently hydrogen, hydrocarbyl, substituted hydrocarbyl or an inert functional group provided that $R^1$ and $R^4$ and/or $R^3$ and $R^5$ taken together may form a ring; and $R^6$ and $R^7$ are each independently substituted aryl.

24. The process as recited in claim 23 wherein $R^6$ is (II) and $R^7$ is (III),

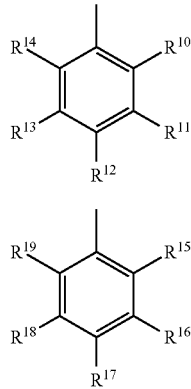

(II)

(III)

wherein:
$R^{10}$, $R^{14}$, and $R^{15}$ are each independently hydrocarbyl, substituted hydrocarbyl or a functional group other than fluoro; and
$R^{11}$ to $R^{13}$ and $R^{16}$ to $R^{18}$ are each independently hydrogen hydrocarbyl, substituted hydrocarbyl or a functional group, and $R^{19}$ is hydrogen or fluoro, and/or any two of $R^{10}$ through $R^{19}$ vicinal to one another may form a ring.

25. The process as recited in claim 24 wherein:
$R^{10}$, $R^{14}$ and $R^{15}$ are each independently alkyl containing 1 to 12 carbon atoms, and/or;
$R^{11}$ through $R^{13}$ and $R^{16}$ through $R^{19}$ are each independently hydrogen or alkyl containing 1 to 12 carbon atoms;
and/or $R^1$, $R^2$, and $R^3$ are hydrogen;
and/or $R^4$ and $R^5$ are both methyl or both hydrogen.

26. The process as described in claim 23 which is a gas phase polymerization process.

27. The process as described in claim 26 wherein said oligomerization catalyst and said copolymerization catalyst are on a support.

28. The process as recited in claim 27 wherein said oligomerization catalyst and said copolymerization catalyst are both on the same support particles.

29. The process as recited in claim 23 wherein said copolymerization catalyst is a Ziegler-Natta catalyst, chromium catalyst, or a metallocene catalyst.

30. The process as recited in claim 20 also comprising one or more added α-olefins and/or one or more additional ethylene oligomerization catalysts having a Schulz-Flory constant of 0.70 or less.

31. The process as recited in claim 23 wherein an ethylene polymerization catalyst which do not readily copolymerize α-olefins is also present.

* * * * *